(12) United States Patent
Tang

(10) Patent No.: US 12,034,661 B2
(45) Date of Patent: Jul. 9, 2024

(54) METHOD FOR COMMUNICATION IN UNLICENSED SPECTRUM AND DEVICE

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 396 days.

(21) Appl. No.: 17/381,060

(22) Filed: Jul. 20, 2021

(65) Prior Publication Data
US 2021/0351890 A1 Nov. 11, 2021

Related U.S. Application Data

(63) Continuation of application No. PCT/CN2019/072585, filed on Jan. 21, 2019.

(51) Int. Cl.
*H04L 5/00* (2006.01)
*H04W 72/044* (2023.01)

(52) U.S. Cl.
CPC .......... *H04L 5/0048* (2013.01); *H04W 72/044* (2013.01)

(58) Field of Classification Search
CPC ............................ H04W 72/044; H04L 5/0048
USPC ....................................................... 370/329
See application file for complete search history.

(56) References Cited

U.S. PATENT DOCUMENTS

| | | | | |
|---|---|---|---|---|
| 2021/0392687 A1* | 12/2021 | Liang | ................... | H04L 27/0006 |
| 2021/0400725 A1* | 12/2021 | Harada | ............... | H04W 74/006 |
| 2022/0095118 A1* | 3/2022 | Harada | ................. | H04L 5/0044 |
| 2022/0095253 A1* | 3/2022 | Harada | ................. | H04L 5/0053 |

FOREIGN PATENT DOCUMENTS

| | | |
|---|---|---|
| CN | 105530647 A | 4/2016 |
| CN | 105992373 A | 10/2016 |
| WO | 2018085204 A1 | 5/2018 |

OTHER PUBLICATIONS

3GPP TSG RAN WG1 Meeting #95 R1-1812298 (Nov. 2018) (Year: 2018).*
3GPP TSG RAN WG1 Meeting #95 R1-1813311 (Nov. 2018) (Year: 2018).*
3GPP TSG RAN WG1 Meeting #95 R1-1812427 (Nov. 2018) (Year: 2018).*
3GPP TSG RAN WG1 Meeting Ah-1901 R1-1900348 (Jan. 2019) (Year: 2019).*

(Continued)

*Primary Examiner* — William Nealon
(74) *Attorney, Agent, or Firm* — BAYES PLLC

(57) ABSTRACT

Embodiments of the present disclosure relate to a method for communication in an unlicensed spectrum and a device. The method includes detecting, by a terminal device, a reference signal. The reference signal is used for indicating that a network device has obtained Channel Occupancy Time (COT). The method further includes detecting, by the terminal device, second information used for indicating data receiving or sending within the COT, after the reference signal has been detected. There are a plurality of the reference signals within the COT.

18 Claims, 5 Drawing Sheets

(56) References Cited

OTHER PUBLICATIONS

3GPP TSG RAN WG1 Meeting Ah-1901 R1-1900871 (Jan. 2019) (Year: 2019).*
International Search Report issued in corresponding International Application No. PCT/CN2019/072585, mailed Sep. 26, 2019, 31 pages.
PCT Written Opinion of the International Searching Authority issued in corresponding International Application No. PCT/CN2019/072585, mailed Sep. 26, 2019, 7 pages.
"3rd Generation Partnership Project; Technical Specification Group Radio Access Network; NR; Physical channels and modulation (Release 16)", 3GPP TS 38.211 V16.0.0 (Dec. 2019), 124 pages.
"Discussion on physical DL channel design in unlicensed spectrum", Agenda Item: 7.2.2.3.1, Source: vivo, 3GPP TSG RAN WG1 Meeting #95, R1-1812298, Spokane, US, Nov. 12-16, 2018, 5 pages.
"3rd Generation Partnership Project; Technical Specification Group Radio Access Network; NR; Radio Resource Control (RRC) protocol specification (Release 16)", 3GPP TS 38.331 V16.0.0 (Mar. 2020), 832 pages.
"Feature lead summary for NR-U DL Signals and Channels", Agenda Item: 7.2.2.3.1, Source: Motorola Mobility, Lenovo, 3GPP TSG RAN WG1 Meeting 95 R1-1812427, Spokane, USA, Nov. 12-16, 2018, 15 pages.
Extended European Search Report issued in corresponding European Application No. 19911047.9, mailed Dec. 9, 2021, 10 pages.
"DL signals and channels for NR-U", Agenda item: 7.2.2.1.2, Source: Qualcomm Incorporated, 3GPP TSG RAN WG1 Meeting AH-1901, R1-1900871, Taipei, Taiwan, Jan. 21-Jan. 25, 2019, 9 pages.
"DL Signals and Channels for NR-U operation", Agenda Item: 7.2.2.3.1, Source: NTT Docomo, Inc., 3GPP TSG RAN WG1 Meeting #95, R1-1813311, Spokane, USA, Nov. 12-16, 2018, 3 pages.
"On DL signals and channels", Agenda Item: 7.2.2.1.2, Source: Nokia, Nokia Shanghai Bell, 3GPP TSG RAN WG1 Meeting AH-1901, R1-1900348, Taipei, Taiwan, Jan. 21-25, 2019, 14 pages.
First Office Action issued in corresponding Indian Application No. 202117034544, mailed Mar. 11, 2022, 9 pages.
"DL signals and channels for NR-U", Agenda Item: 7.2.2.1.2, Source: Ericsson, 3GPP TSG-RAN WG1 Meeting Ad Hoc 1901, R1-1900996, Taipei, Taiwan, Jan. 21-25, 2019, 8 pages.
Communication pursuant to Article 94(3) EPC issued in corresponding European Application No. 19 911 047.9, mailed on May 2, 2024, 6 pages

* cited by examiner

METHOD FOR COMMUNICATION IN UNLICENSED SPECTRUM AND DEVICE

CROSS-REFERENCE TO RELATED APPLICATION

This application is a continuation of International Application No. PCT/CN2019/072585, filed on Jan. 21, 2019, the entire contents of which are incorporated herein by reference.

BACKGROUND

The present disclosure relates to the field of communication, and particularly, to a communication method and device for unlicensed spectrum.

Unlicensed spectrum is the spectrum that can be used for communication of radio device and is divided by countries and regions. This spectrum is generally considered as a shared spectrum, i.e. the communication device in different communication systems can use the spectrum if it meets the regulations set by the countries or regions on the spectrum, and there is no need to apply to the government for an exclusive spectrum authorization.

The New radio (NR) system supports data transmission on the unlicensed spectrum. For the NR-Unlicensed (NR-U) system, how to improve the efficiency of a terminal device in detecting the information used for indicating data transceiving within the Channel Occupancy Time (COT) is an urgent problem to be solved.

SUMMARY

The embodiment of present disclosure provides a communication method and device for the unlicensed spectrum, which can improve the efficiency of the terminal device in detecting the information used for indicating data transceiving within the COT, in the aspect of the unlicensed spectrum communication.

In a first aspect, a communication method for unlicensed spectrum is provided, the method including detecting, by a terminal device, first information used for indicating Channel Occupancy Time (COT) information; and detecting, by the terminal device, second information used for indicating data receiving or sending within the COT, based on the COT information.

In this solution, the terminal device detects the first information for indicating the COT within the COT, so that the terminal device can obtain the information related to the COT after the first information has been detected. Therefore, when detecting the second information used for indicating data transceiving within the COT based on the COT information, the efficiency of detecting the second information can be improved.

In a second aspect, a communication method for unlicensed spectrum is provided, the method including detecting, by a terminal device, a reference signal, where the reference signal is used for indicating that a network device has obtained Channel Occupancy Time (COT); and detecting, by the terminal device, second information used for indicating data receiving or sending within the COT, after the reference signal has been detected; where there are a plurality of the reference signals within the COT.

In this solution, there may be a plurality of the reference signals within the COT, which can avoid the problem that if there is only one reference signal within the COT, the terminal device may not detect the reference signal due to detection issues of the terminal device or channel quality issues. That is, the problem that the terminal device misses to detect the reference signal may be avoid.

In a third aspect, a communication method for unlicensed spectrum is provided, the method including sending, by a network device, first information used for indicating Channel Occupancy Time (COT) information to a terminal device; and sending, by the network device, second information used for indicating data receiving or sending to the terminal device.

In a fourth aspect, a communication method for unlicensed spectrum is provided, the method including sending, by a network device, a plurality of reference signals to a terminal device, within Channel Occupancy Time (COT), where the reference signals are used for indicating that the network device has obtained the COT; and sending, by the network device, second information used for indicating data receiving or sending to the terminal device.

In a fifth aspect, a terminal device is provided for performing the method in any one of the above-mentioned first aspect to the second aspect or in each implementation thereof.

In particular, the terminal device includes a functional module configured to perform the method in any one of the above-mentioned first aspect to the second aspect or in each implementation thereof.

In a sixth aspect, a terminal device is provided for performing the method in any one of the above-mentioned third aspect to the fourth aspect or in each implementation thereof.

In particular, the network device includes a functional module configured to perform the method in any one of the above-mentioned third aspect to the fourth aspect or in each implementation thereof.

In a seventh aspect, a terminal device is provided, including a processor and a memory. The memory is configured to store a computer program, and the processor is configured to call and run the computer program stored in the memory to perform the method in any one of the above-mentioned first aspect to the second aspect or in each implementation thereof.

In an eighth aspect, a network device is provided, including a processor and a memory. The memory is configured to store a computer program, and the processor is configured to call and run the computer program stored in the memory to perform the method in any one of the above-mentioned third aspect to the fourth aspect or in each implementation thereof.

In a ninth aspect, a chip is provided for performing the method in any one of the above-mentioned first aspect to the fourth aspect or in each implementation thereof.

In particular, the chip includes a processor configured to call and run a computer program from a memory, so that a device installed with the chip performs the method in any one of the above-mentioned first aspect to the fourth aspect or in each implementation thereof.

In a tenth aspect, a computer-readable storage medium is provided for storing a computer program that enables a computer to perform the method in any one of the above-mentioned first aspect to the fourth aspect or in each implementation thereof.

In an eleventh aspect, a computer program product is provided, including a computer program instruction that enables a computer to perform the method in any one of the above-mentioned first aspect to the fourth aspect or in each implementation thereof.

In a twelfth aspect, a computer program is provided, which when running on a computer enables a computer to perform the method in any one of the above-mentioned first aspect to the fourth aspect or in each implementation thereof.

DETAILED DESCRIPTION

The technical solutions in the embodiments of the present disclosure will be described below in conjunction with the drawings in the embodiments of the present disclosure. Obviously, the described embodiments are part of the embodiments of the present disclosure, rather than all of them. Based on the embodiments in the present disclosure, all the other embodiments obtained by those of ordinary skill in the art without creative work fall within the protection scope of the present disclosure.

The technical solution in the embodiments of the present disclosure can be applied to various communication systems, such as a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an Advanced Long Term Evolution (LTE-A) system, a New Radio (NR) system, an evolution system of NR system, a LTE-based access to unlicensed spectrum (LTE-U) system, a NR-based access to unlicensed spectrum (NR-U) system, a Universal Mobile Telecommunication System (UMTS) system, Wireless Local Area Networks (WLAN), Wireless Fidelity (WiFi), a next generation communication system or other communication system, etc.

Generally speaking, traditional communication systems support a limited number of connections and are easy to implement. However, with the development of communication technology, the mobile communication systems will not only support traditional communication, but also support, for example, Device to Device (D2D) communication, Machine to Machine (M2M) communication, Machine Type Communication (MTC), and Vehicle to Vehicle (V2V) communication, etc. The embodiments of the present disclosure can also be applied to these communication systems.

Optionally, the communication system in the embodiment of the present disclosure may be applied to a Carrier Aggregation (CA) scenario, may also be applied to a Dual Connectivity (DC) scenario, and may also be applied to a Standalone (SA) network deployment scenario.

Figure 1:
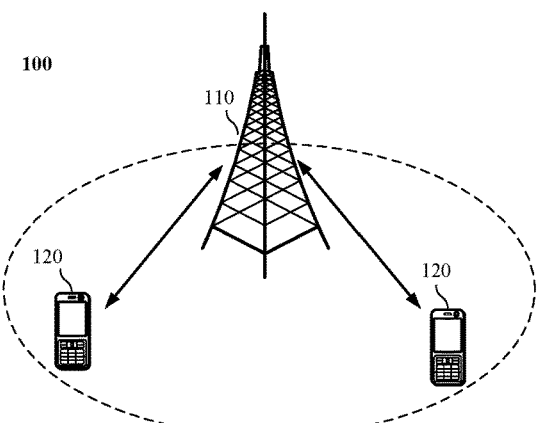
FIG. 1 is a schematic diagram of architecture of a communication system according to an embodiment of the present disclosure.

Exemplarily, a communication system 100 applied in the embodiments of the present disclosure is shown in FIG. 1. The communication system 100 may include a network device 110, which may be a device that communicates with a terminal device 120 (or referred as a communication terminal or a terminal). The network device 110 may provide communication coverage for a specific geographic area, and may communicate with the terminal device located within the coverage area. Optionally, the network device 110 may be a Base Transceiver Station (BTS) in a GSM system or a CDMA system, and may also be a Node B (NB) in a WCDMA system, and may also be an Evolutional Node B (eNB or NodeB) in an LTE system, or a wireless controller in a Cloud Radio Access Network (CRAN), or the network device may be a mobile switching center, a relay station, an access point, an in-vehicle device, a wearable device, a hub, a switch, a bridge, a router, a network side device in a 5G network or a network device in the future evolved Public Land Mobile Network (PLMN), etc.

The communication system 100 also includes at least one terminal device 120 located within the coverage area of the network device 110. As the "terminal device" used herein, it includes, but is not limited to, connection via a wired line, such as via Public Switched Telephone Networks (PSTN), a Digital Subscriber Line (DSL), a digital cable, a direct cable connection; and/or another data connection/network; and/or via a wireless interface, for example, a transmitter for a cellular network, a Wireless Local Area Network (WLAN), a digital TV network such as a DVB-H network, a satellite network and an AF-FM broadcast; and/or an apparatus of another terminal device which is arranged to receive/send communication signals; and/or an Internet of Things (IoT) device. The terminal device arranged to communicate via a wireless interface may be referred to as a "wireless communication terminal", a "wireless terminal" or a "mobile terminal". Examples of mobile terminals include, but are not limited to, a satellite or cellular phone; a Personal Communications System (PCS) terminal that may combine a cellular wireless phone with data processing, fax and data communication capabilities; a PDA that may include a radio phone, a pager, an Internet/intranet access, a Web browser, a memo pad, a calendar, and/or a Global Positioning System (GPS) receiver; and a conventional laptop and/or a palmtop receiver or other electric apparatus including a radiophone transceiver. The terminal device may refer to an access terminal, a User Equipment (UE), a user unit, a user station, a mobile station, a mobile platform, a remote station, a remote terminal, a mobile device, a user terminal, a terminal, a wireless communication device, a user agent or a user apparatus. The access terminal may be a cellular phone, a cordless phone, a Session Initiation Protocol (SIP) phone, a Wireless Local Loop (WLL) station, a personal digital assistant (PDA), a handheld device with wireless communication function, a computing device or other processing devices connected to wireless modems, an in-vehicle device, a wearable device, a terminal device in a 5G network or a terminal device in the future evolved PLMN, etc.

Optionally, D2D communication may be performed between the terminal devices 120.

FIG. 1 exemplarily illustrates one network device and two terminal devices. Optionally, the communication system 100 may include a plurality of network devices, and the coverage area of each network device may include other numbers of terminal devices, which is not limited by the embodiments of the present disclosure.

Optionally, the communication system 100 may also include other network entities such as a network controller, a mobile management entity, etc., which is not limited by the embodiments of the present disclosure.

It should be understood that a device with communication function in the network/system in the embodiments of the present disclosure can be referred to as a communication device. By the example of the communication system 100 shown in FIG. 1, the communication device may include a network device 110 and a terminal device 120 with communication function, and the network device 110 and the terminal device 120 may be the specific devices described above, which will not be elaborated here; and the communication device may also include other devices in the communication system 100, such as other network entities such as a network controller, a mobile management entity, etc., which is not limited by the embodiments of the present disclosure.

It should be understood that the terms "system" and "network" are often used interchangeably herein. The term "and/or" herein is only to describe a kind of association relationship among associated objects, and means that there may be three kinds of relationships. For example, A and/or B may mean that there are the following three cases: A exists alone, A and B exist at the same time, and B exists alone. In addition, the character "/" herein generally indicates that the associated objects are in an "or" relationship.

The method in the embodiment of the present disclosure may be applied to the communication of the unlicensed spectrum, and may also be applied to other communication scenarios, such as a communication scenario of the licensed spectrum.

Figure 2:
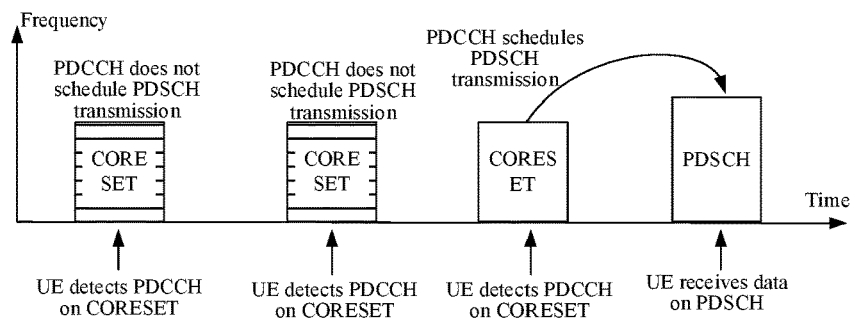
FIG. 2 is a schematic diagram of PDCCH detection on NR licensed spectrum according to an embodiment of the present disclosure.

As shown in FIG. 2, on the NR licensed spectrum, a terminal device may detect a Physical Downlink Control Channel (PDCCH) on a preconfigured Control Resource Set (CORESET). After having detected the PDCCH scrambled by a Radio Network Temporary Identity (RNTI), the terminal device may obtain a scheduling indication through Downlink Control Information (DCI) carried on the PDCCH, and may receive data on the indicated Physical Downlink Shared Channel (PDSCH) resource position, or send data on the indicated Physical Uplink Shared Channel (PUSCH) resource.

On the NR licensed spectrum, the preconfigured CORESET mentioned above is a set of control resources that appears periodically. The network device may send DCI messages on one or more resources in this set of resources, to schedule the terminal device to perform data receiving or sending. By detecting the DCI message on the PDCCH channel on this set of resources, the terminal device may know whether the terminal device is scheduled, and obtain scheduling information, and then perform data transceiving.

On the NR licensed spectrum, each terminal device may be configured with a plurality of CORESETs. As a set of control resources appearing periodically, each CORESET has the attributes of frequency domain resource position, time domain resource position and the like. Respective control resource sets configured for the UE may have configuration parameters which are different in whole or in part.

On the NR licensed spectrum, each CORESET of each terminal may be associated with specific time sequence configuration information and other configuration information. These pieces of configuration information are configured in the form of search spaces, where the search spaces may include a period of a control resource appearing periodically, an offset within the period, aggregation level information, etc.

When the licensed spectrum is being studied, due to precious resources of the licensed spectrum, the study and utilization of the unlicensed spectrum are also carried out at the same time.

The unlicensed spectrum is the spectrum that can be used for radio device communication, divided by countries and regions. This spectrum may be generally considered as shared spectrum, that is, the communication devices in different communication systems can use the spectrum if meeting the regulations set by the country or region on the spectrum, without applying to the government for an exclusive spectrum authorization. In order to make various communication systems that use the unlicensed spectrum for wireless communication to coexist friendly on this spectrum, the communication device may follow the principle of Listen Before Talk (LBT) when communicating on the unlicensed spectrum. That is, before sending a signal on a channel of the unlicensed spectrum, the communication device needs to perform channel sensing (or referred to as channel detection) firstly. Only when the result of channel sensing is that the channel is idle, the communication device can send the signal; and if the result of channel sensing by the communication device on the unlicensed spectrum is that the channel is busy, then the signal cannot be sent.

In order to understand the present disclosure more clearly, two concepts applied in the unlicensed spectrum communication will be described below.

Maximum Channel Occupancy Time (MCOT) may refer to the maximum length of time within which the channel of the unlicensed spectrum is allowed to be used for signal transmission after LBT succeeds. There are different MCOTs under different channel access schemes. The maximum value of MCOT may be for example 10 ms. It should be understood that the MCOT is the time occupied by signal transmission.

COT may refer to the length of time for signal transmission by using the channel of unlicensed spectrum after LBT succeeds, and within this length of time, the signal may occupy the channel discontinuously. The length of time occupied by signal transmission in the COT does not exceed MCOT.

Based on the above characteristics of the unlicensed spectrum, data sending on the unlicensed spectrum can only be performed after the network device obtains an available channel (i.e. after obtaining one COT through LBT). Under this constraint, a mode of performing data sending and corresponding receiving directly on the unlicensed spectrum is a design of multiplexing the NR licensed spectrum. In other words, after determining the CORESET and its configuration information, such as a search space, the network device may send the determined CORESET and its configuration information to the terminal device. The network device may schedule the terminal device to perform data sending or receiving on one or more resources of this set of resources. The terminal device is configured with the CORESET and its configuration information. By detecting the PDCCH channel on the CORESET, the terminal device may know whether it is scheduled, and obtain the scheduling information, and then perform data transceiving.

Figure 3:
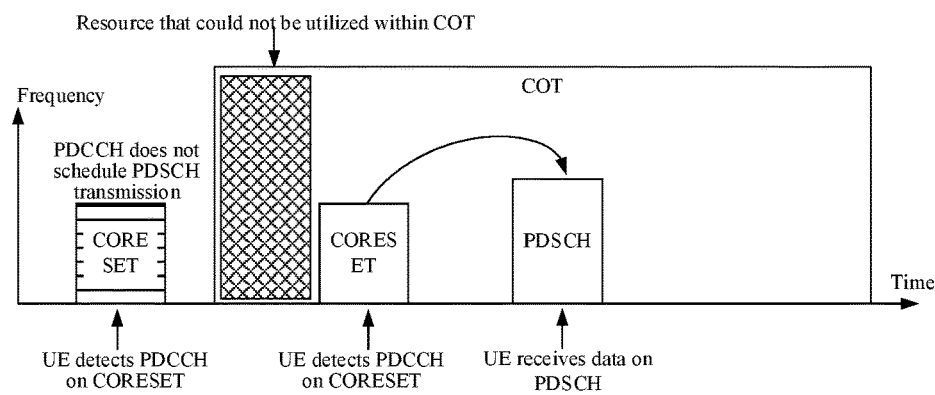
FIG. 3 is a schematic diagram of a waste of resources caused by the interval between a starting position of COT and a starting position of CORESET within the COT according to an embodiment of the present disclosure.

In the above process, when there is a time interval between the starting time of the COT occupied by the network device and the CORESET configured for the terminal device, as shown in FIG. 3, on the one hand, the channel resources within the interval time will not be effectively utilized by the network device and the terminal device, and the idle channel may be occupied by other device again, thereby the system performance may be affected. On the other hand, since the resources within the time interval may not be effectively utilized by the network device and the terminal device, even if the above idle channel is not occupied by other device again, these channel resources are in an idle state, resulting in a waste of resources.

Figure 4:
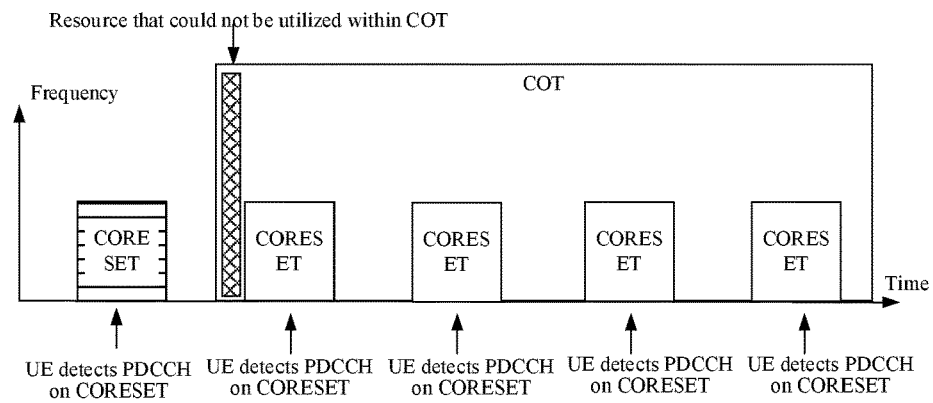
FIG. 4 is a schematic diagram of reducing a monitoring period of the CORESET according to an embodiment of the present disclosure.

One way to solve the above problem is to increase configuration density of the CORESET, i.e. to shorten a monitoring period of the CORESET (in the NR, the period is configured in the search space). That is, the time interval between the starting position of the CORESET and the starting position of the COT is shortened as far as possible in the time domain, thereby reducing the waste of resources, as shown in FIG. 4.

It can be seen that in the above method, the terminal device needs to monitor more CORESET positions, and such frequent monitoring will increase the energy consumption of the terminal device. In addition, if the method of shortening the monitoring period of CORESET is adopted, this relatively dense configuration and monitoring mode of CORESET may generally gain only outside the COT and at the initial stage of the COT. The reason is that only when the network device does not know when the COT starts, it needs to use the relatively dense control resource set configuration to wait for the success of LBT. After the base station has occupied the channel, the base station may schedule data sending within the COT as needed. Correspondingly, on the terminal device side, the terminal device may only use the dense CORESET configuration outside the COT to detect the PDCCH, so as to cope with the start of the COT at any time. Once the terminal device determines that the COT has begun, it may use relatively sparse CORESET configuration to detect the PDCCH, so as to avoid the complexity and energy consumption caused by additional detection.

On the basis of the above analysis, it can be found that the starting position of the COT is determined by the result of LBT of the network device, so the starting position of the COT is uncertain, and the terminal device may not know it in advance. In this case, how the terminal device to obtain the starting position of the COT is a problem that needs to be studied and solved.

Figure 5:
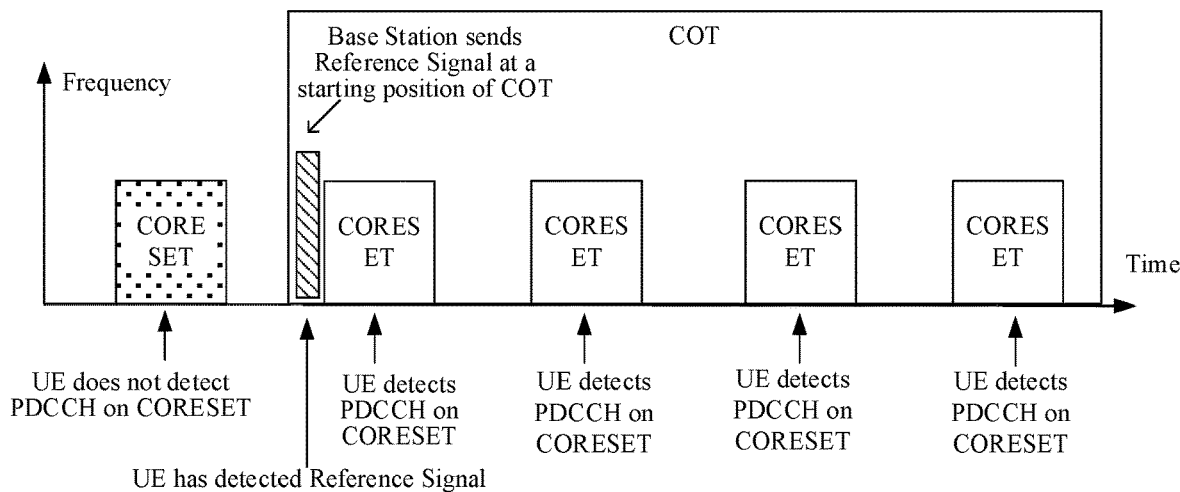
FIG. 5 is a schematic diagram of indicating the starting position of the COT by a reference signal according to an embodiment of the present disclosure.

FIG. 5 is a proposed method for a terminal device to obtain a starting position of the COT. When the LBT of the network device succeeds, the network device may send a reference signal to the terminal device at the starting position of the COT. When the terminal device detects that the reference signal begins, it may obtain scheduling information for data transceiving by detecting a DCI message carried on a PDCCH on a configured CORESET.

However, when the terminal device performs DCI detection on the configured CORESET, how to improve the efficiency of the terminal device in detecting the information used for indicating data transceiving within the COT has not been clearly stipulated. The embodiment of the present disclosure provides the following scheme, in which the terminal device may improve the efficiency of detecting the information used for indicating data transceiving within the COT. The detailed introduction will be described below.

Figure 6:
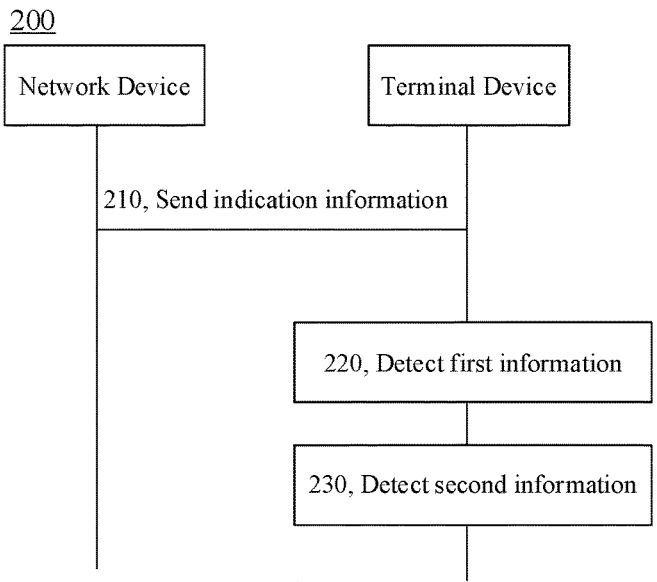
FIG. 6 is a schematic flow chart of a communication method for unlicensed spectrum according to an embodiment of the present disclosure.

FIG. 6 is a schematic flow chart of a communication method 200 for the unlicensed spectrum according to an embodiment of the present disclosure. The method 200 includes at least part of the following.

It should be noted that the embodiment of the present disclosure takes a sending device as a network device and a receiving device as a terminal device as an example for description, but the present disclosure is not limited to this. The method of the embodiment of the disclosure may also be applied to other scenarios, such as a scenario of D2D transmission or V2V transmission, i.e. both the sending device and the receiving device are terminal devices.

In 210, a network device sends first information to a terminal device, where the first information is used for indicating COT information of the COT obtained by the network device.

In 220, the terminal device detects the first information sent by the network device.

In 220, the terminal device detects second information used for indicating data receiving or sending within the COT, based on the COT information.

The COT information may include, but is not limited to, at least one of: a length of the COT, uplink and downlink configuration information within the COT, Synchronization Signal Block (SSB) information within the COT, Channel-State Information Reference Signal (CSI-RS) configuration information within the COT and a rate matching resource within the COT.

Since the detection modes of the terminal device within the COT and outside the COT may be different, the terminal device obtains the length of the COT, so that the terminal device may determine whether it is within the COT or outside the COT at present, thereby different detection modes may be adopted.

After obtaining the uplink and downlink configuration information within the COT, the terminal device may not need to detect the DCI on the entire CORESET, but only needs to detect the DCI on the CORESET in the downlink part, thereby avoiding unnecessary detection and improving the detection efficiency.

The terminal device obtains the SSB information and the CSI-RS configuration information within the COT, which may eliminate the interference of SSB and CSI-RS on downlink sending data, thereby the reliability of the terminal device in data receiving or sending can be improved.

After obtaining the rate matching resource, the terminal device may determine which resources on the CORESET have been occupied, so that unavailable resources may be avoided during the detection, and the detection efficiency may be improved.

It should be understood that in the embodiment of the present disclosure, "first" and "second" are only used to distinguish different objects, but do not constitute the restriction of the scope of the embodiment of the present disclosure.

Optionally, detecting the first information by the terminal device may include the following steps: the terminal device obtains a second resource, where the second resource may include a CORESET resource and a search space associated with the CORESET resource, and then the terminal device may detect the first information on the second resource.

Optionally, the terminal device may obtain the second resource based on a protocol provision; or, the terminal device may obtain the second resource by a broadcast message; or, the terminal device may receive a Radio Resource Control (RRC) dedicated signaling configured with the second resource, and after having received the RRC dedicated signaling, the terminal device may obtain the second resource.

Regarding the specific implementation process of the method 200, specifically, for the terminal device, the terminal device may determine two sets of different resources firstly, i.e. the second resource and the third resource. For example, the second resource may be a set of CORESET resources, including configuration of the CORESET itself and configuration of a search space associated with the CORESET. The third resource is another set of CORESET resources, which may include configuration of the CORESET itself and configuration of a search space associated with the CORESET. The terminal device may detect the first information on the second resource firstly, where the first information may be carried on a first channel scrambled by a first sequence. After the terminal device has detected the first information on the second resource, the terminal device may begin to detect the second information on the third resource, where the second information may be carried on a second channel scrambled by a second sequence.

Correspondingly, for the network device, the network device determines the second resource and the third resource, and when the network device has detected that the channel is idle and available, it sends the first information on the second resource within the COT, and schedules data transceiving of the terminal device on the third resource within the COT.

Optionally, detecting the second information by the terminal device may be detecting the second information through a PDCCH scrambled by a Cell Radio Network Temporary Identity (C-RNTI).

Optionally, the PDCCH in the embodiment of the disclosure may be a common PDCCH, or may be an Enhanced Physical Downlink Control Channel (EPDCCH), a Machine Type Communication Physical Downlink Control Channel (MPDCCH), a Physical Sidelink Control Channel (PSCCH), or a Narrowband Physical Downlink Control Channel (NPDCCH), which is not specifically limited in the embodiment of the disclosure.

It should be understood that the mode in which the terminal device determines the third resource may refer to the mode in which the terminal device determines the second resource, which will not be repeated here.

Optionally, the network device may send the first information to the terminal device at a starting position of the COT, and correspondingly, the terminal device may detect the first information at the starting position of the COT.

The terminal device detects the first information at the starting position of the COT, so that it may obtain the COT information at the starting position of the COT, thereby the detection efficiency of detecting the DCI may be more effectively improved.

In the embodiment of the present disclosure, there may be a plurality pieces of first information within one COT. That is, after the LBT of the network device succeeds, the network device may send the first information to the terminal device several times within the COT.

If there is only one piece of the first information within the COT, there may be a problem that the terminal device fails to detect the first information due to detection issues or channel quality issues. Due to the plurality pieces of the first information within the COT, the problem that the terminal device misses to detect the first information can be avoided.

In the embodiment of the present disclosure, the method 200 may further include the terminal device determining that the COT begins.

In some embodiments, the mode in which the terminal device determines that the COT begins may be as follows: the network device sends a reference signal to the terminal device, where the reference signal is used for indicating that the network device has obtained the COT, and after the terminal device has detected the reference signal, it may determine that the COT begins.

The network device sends the reference signal to the terminal device. As an example, the network device may only send one reference signal to the terminal device at the starting position of the COT.

As another example, the network device may send the reference signal several times within the COT. In other words, there may be a plurality of the reference signals within the COT, and the reference signals may be distributed at different positions of the COT, where the different positions may include the starting position of the COT. In this way, the problem that the terminal device misses to detect the reference signal can be avoided.

The network device may send the reference signal to the terminal device periodically within the COT. For example, the network device may send the reference signal to the terminal device every 2 ms.

It can be seen that the embodiment of this disclosure may include several cases: a. the network device sends one piece of first information and one reference signal to the terminal device; b. the network device sends a plurality pieces of first information and one reference signal to the terminal device; c. the network device sends one piece of first information and a plurality of reference signals to the terminal device; d. the network device sends a plurality pieces of first information and a plurality of reference signals to the terminal device.

Optionally, the reference signal in the embodiment of the disclosure may be any one of the following signals: a random access preamble (Preamble), a Primary Synchronization Signal (PSS), a Secondary Synchronization Signal (SSS), a Demodulation Reference Signal (DMRS), a Channel-State Information Reference Signal (CSI-RS), or a newly designed reference signal used for indicating the COT information.

If the reference signal is a DMRS, the first resource used for detecting the reference signal by the terminal device may be a same resource as the second resource.

Optionally, the first resource and the second resource may be a CORESET resource. It should be noted that a resource actually occupied by the DMRS in the CORESET resource and a resource actually occupied by the first information in the CORESET resource are not the same resource.

Optionally, the first resource (for ease of description, the first resource and the second resource are collectively referred to as the first resource here) may be different from a third resource, i.e. the first resource may be a different CORESET from the third resource; or, the first resource and the third resource may be different PDCCHs in the same CORESET resource.

At this time, detecting the reference signal by the terminal device may include the following steps: the terminal device obtains the first resource, where the first resource may include a CORESET resource and a search space associated with the CORESET resource, and then the terminal device may detect the detection signal on the first resource.

Optionally, the terminal device may obtain the first resource based on a protocol agreement; or, the terminal device may obtain the first resource through a broadcast message; or, the terminal device may obtain a RRC dedicated signaling configured with the first resource, and after having received the RRC dedicated signaling, the terminal device may obtain the first resource.

Figure 7:
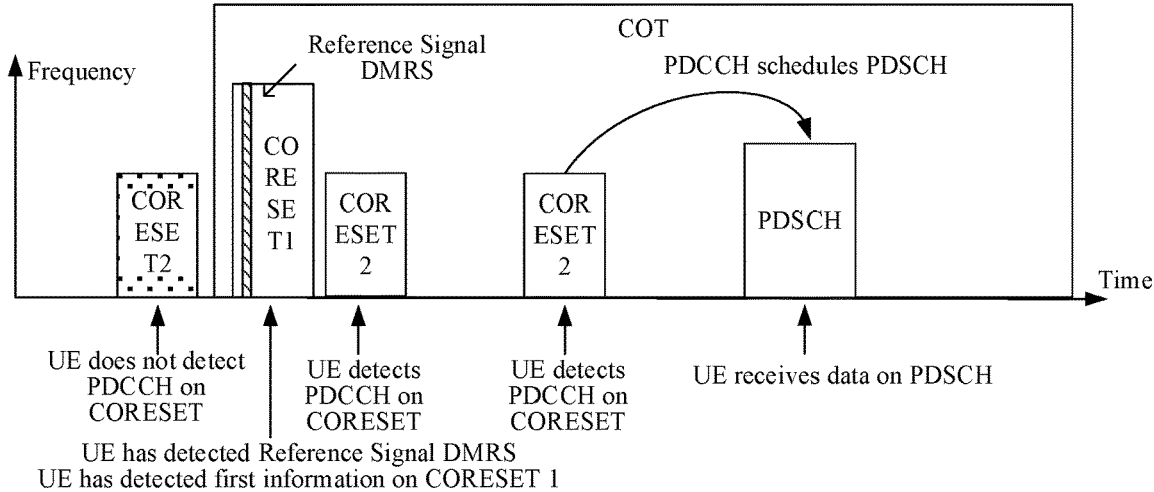
FIG. 7 is a schematic diagram of detecting the reference signal and first information by a terminal device according to an embodiment of the present disclosure.

The network device sends one piece of first information and one reference signal to the terminal device within the COT, as shown in FIG. 7. In FIG. 7, CORESET 1 is the first resource (for ease of description, the first resource and the second resource are collectively referred to as the first resource here), and CORESET 2 is the third resource. Specifically, the terminal device may determine two different sets of resources, i.e. the first resource and the third resource. For example, the first resource may be a set of CORESET resources, including configuration of the CORESET itself and configuration of a search space associated with the CORESET, and DMRS configuration on the CORESET. The third resource is another set of CORESET resources, including configuration of the CORESET itself and configuration of a search space associated with the CORESET.

The terminal device may detect the reference signal (DMRS) on the first resource firstly, and after having detected the reference signal, the terminal device knows that the COT has begun, then the terminal device may detect the first information on the first resource. Since the complexity of signal detection is less than the complexity of information detection on the channel, the terminal device determines that the current COT has begun by detecting the reference signal firstly, i.e. there is the first information, and then detects the first information on the first resource, thereby the detection complexity of the terminal device can be reduced.

When the terminal device has detected the first information on the first resource, the terminal device may begin to detect second information on the third resource, where the second information may be carried on a second channel scrambled by a second sequence. Correspondingly, for the network device, the network device determines the first resource and the second resource, and when the network device has detected that the channel is idle and available, it sends the reference signal and the first information on the first one of the first resources within the COT, and schedules data transceiving of the terminal device on the second resource within the COT.

It should be understood that the specific example of the embodiment of the present disclosure is only used to help those skilled in the art to understand the embodiment of the present disclosure better, rather than limiting the scope of the embodiment of the present disclosure.

Figure 8:
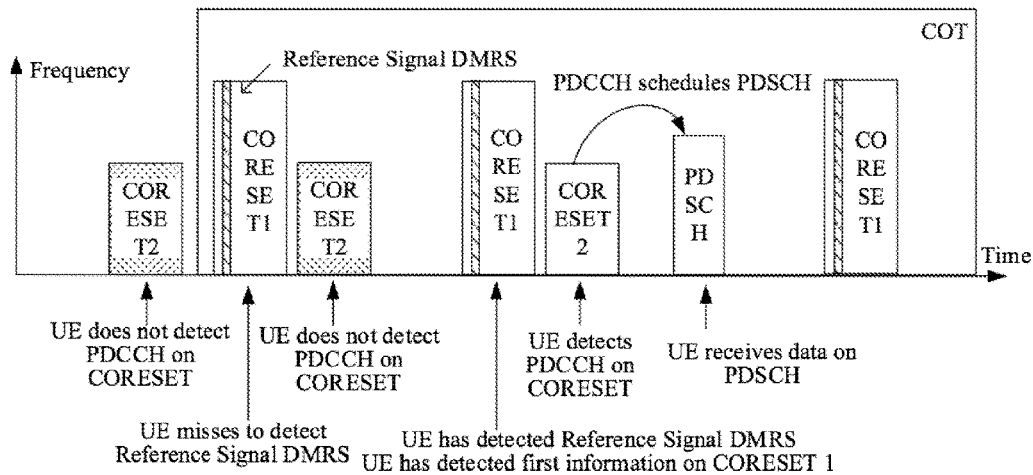
FIG. 8 is another schematic diagram of detecting the reference signal and the first information by the terminal device according to an embodiment of the present disclosure.

The network device sends a plurality pieces of first information and a plurality of reference signals to the terminal device within the COT, as shown in FIG. 8. In FIG. 8, CORESET 1 is the second resource, and CORESET 2 is the third resource. It should be understood that when the network device sends the plurality pieces of the first information to the terminal device within the COT, the implementation of the network device and the terminal device may refer to the implementation of the network device and the terminal device when the network device sends a plurality pieces of first information to the terminal device within the COT, which will not be described again for brevity.

If the reference signal is a signal other than the DMRS, the first resource may be different from the second resource.

At this time, detecting the reference signal by the terminal device may include the following steps: the terminal device obtains configuration information of the reference signal, where the configuration information of the reference signal may include a generation mode of the reference signal and a first resource, and then the terminal device may detect the reference signal on the first resource.

Specifically, for the terminal device, the terminal device may determine the configuration information of the reference signal, where the configuration information of the reference signal may include but not limit to the generation mode of the reference signal and time-frequency-domain position information of the reference signal, i.e. the first resource information, where the first resource may be a periodical resource. The terminal device determines a set of CORESET resources, where the CORESET resources may include but not limit to configuration of the CORESET itself and configuration of a search space associated with the CORESET, i.e. the second resource. The terminal device determines another set of CORESET resources, which may include but not limit to configuration of the CORESET itself and configuration of a search space associated with the CORESET, i.e. the third resource.

After the terminal device detects the reference signal on the first resource, it determines that the current COT begins, i.e. there is the COT first information, and then detects the first information on the second resource, where the first information is carried on a second channel scrambled by a second sequence. After the terminal device has detected the first information on the second resource, it may detect second information on the third resource, where the third information may be carried on a third channel scrambled by a third sequence.

It can be seen from FIG. 8 that although the problem that the terminal device misses to detect the reference signal and the first information can be avoided by sending the plurality pieces of the first information and the plurality of the reference signals to the terminal device within the COT by the network device, some disadvantages are also brought out. Since the reference signal and the first information need to be sent several times within the COT, the limited COT resources are occupied by the reference signal and the first information, and then the resource overhead is too large.

For the above problem, a period of the first resource may be set to be less than a period of the second resource.

Figure 9:
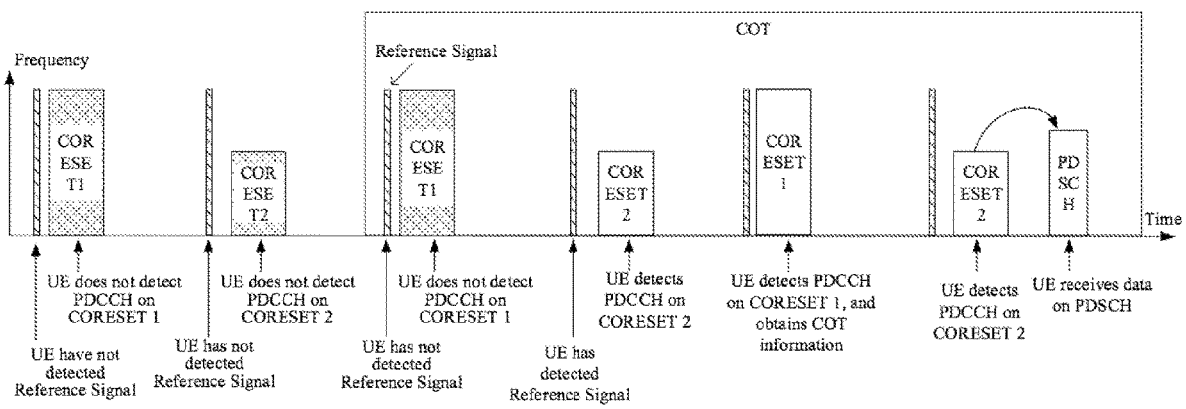
FIG. 9 is still another schematic diagram of detecting the reference signal and the first information by the terminal device according to an embodiment of the present disclosure.

Specifically, referring to FIG. 9 in which CORESET 1 is the second resource and CORESET 2 is the third resource, the description takes the reference signal as a Preamble as an example. The terminal device determines the first resource, the second resource, the third resource. The mode in which the terminal device determines the first resource, the second resource and the third resource may refer to the above description, which will not be described here again.

After the terminal device densely detects the reference signal on the first resource with a small detection period, it determines that the current COT has begun, i.e. there is the COT first information, and then detects first information on the second resource, where the first information is carried on a second channel scrambled by a second sequence. After the terminal device has detected the first information, the terminal device may utilize the relatively sparse third resource to detect second information, where the third information is carried on a third channel scrambled by a third sequence.

In the above technical scheme, the terminal device densely detects the reference signal on the first resource with a small detection period. This dense first resource is beneficial to shorten the time interval between the starting position of the COT and the position of the first resource, which may improve resource utilization. The terminal device utilizes the relatively sparse third resource to detect the second information, which may reduce the detection complexity and the energy consumption of the terminal device.

In one possible embodiment, detecting the first information by the terminal device may include the terminal device detecting the first information based on a parameter of a reference signal.

Optionally, the parameter of the reference signal may be a sequence of the reference signal or a time-frequency resource position of the reference signal.

In this embodiment, the terminal device may determine the position of the reference signal within the COT based on the parameter of the reference signal, and then detects the first information based on the position of the reference signal within the COT.

Specifically, when the network device sends the reference signal to the terminal device, a parameter of the reference signal sent at the starting position of the COT may be different from a parameter of the reference signal sent at other position of the COT.

For example, the network device adopts sequence A for sending in a first time unit within the COT, and adopts sequence B for sending in other time unit within the COT. The time unit may be a sub-frame, a time slot, a time domain symbol, or a Short Transmission Timing Interval (sTTI). In this way, when the network device has detected the sequence A, it may determine that it is currently the first time unit within the COT; and when the network device has detected the sequence B, it may determine that it is currently a non-first time unit within the COT.

In this way, the terminal device may distinguish whether it is currently at the starting position of the COT or in the position within the COT through the reference signal, thereby the terminal device may adopt different time sequences to detect the first information and the second information on different preconfigured resources.

For example, if the network device utilizes a fourth resource to send the reference signal on the starting position of the COT and utilizes a fifth resource to send the reference signal on other position of the COT, the detection time sequence of the fourth resource and the detection time sequence of the fifth resource may be different (the detection periods are different). The terminal device may adopt a denser detection period in the first time slot within the COT, such as detecting once every X (X=4) symbols. The terminal device may adopt a sparser detection period in other time slot within the COT, such as every Y(Y=7) symbols, or every Z (Z=1/2/4/8) symbols.

In one possible embodiment, during the time after the terminal device has detected the reference signal and before the terminal device has detected the first information, and during the time after the terminal device has detected the reference signal and after the terminal device has detected the first information, the terminal device may adopt different detection modes when detecting the second information on the determined CORESET.

Optionally, a resource for detecting the second information before having detected the first information and a resource for detecting the second information after having detected the first information, by the terminal device, may be different. Exemplarily, before the terminal device has detected the first information, the resource for detecting the second information may include an uplink resource; after the terminal device has detected the first information, the resource for detecting the second information may include an uplink resource.

For example, before the terminal device has detected the first information, the terminal device does not obtain COT information, and is not certain with a rate matching resource and configuration situation of uplink and downlink within the COT, therefore the terminal device detects the second information on the determined CORESET. After the terminal device has detected the first information, the terminal device obtains the rate matching resource and the configuration situation of the uplink and downlink within the COT, the terminal device may only detect the second information on the determined CORESET within the downlink part.

In this way, it may reduce unnecessary PDCCH detection by the terminal device, and reduce the energy consumption of the terminal device at the same time.

In the embodiment of the present disclosure, the terminal device detects the first information used for indicating the COT within the COT, so that the terminal device may obtain information related to the COT after having detected the first information. Therefore, when the terminal device detects the second information used for indicating data transceiving within the COT based on the COT information, the efficiency of detecting the second information may be improved.

Figure 10:
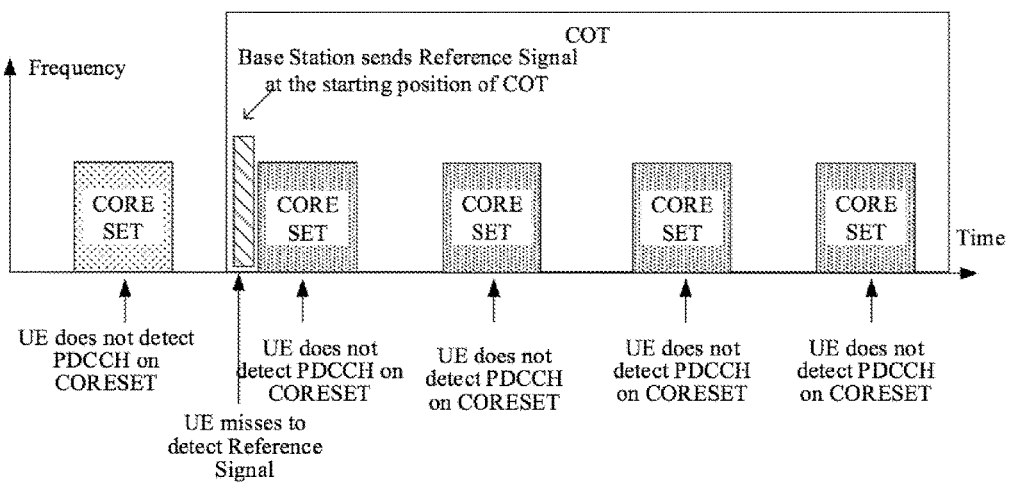
FIG. 10 is a schematic diagram of missing to detect the reference signal by the terminal device according to an embodiment of the present disclosure.

If the network device only sends one reference signal within the COT, i.e. only sends the reference signal to the terminal device at the starting position of the COT, when the terminal device fails to detect the reference signal due to detection issues of the terminal device or channel quality issues, i.e. when the terminal device misses the reference signal, even if LBT of the network device successfully obtains the COT, the network device may not successfully schedule data transceiving of the terminal device, because at this time the terminal device will not monitor the CORESET within the COT, as shown in FIG. 10.

Regarding to this, the embodiment of the present disclosure provides a scheme, which may avoid the potential issue that the COT resource missed to be detected by the terminal device may not be utilized when the reference signal is only sent at the starting position of the COT. The detailed introduction will be described below.

Figure 11:
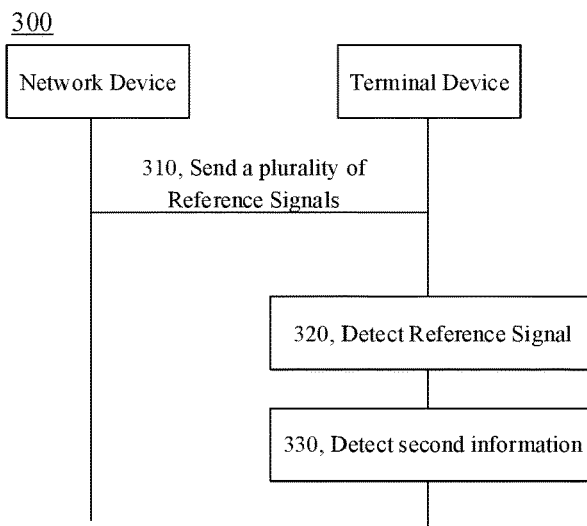
FIG. 11 is a schematic flow chart of another communication method for the unlicensed spectrum according to an embodiment of the present disclosure.

FIG. 11 is a schematic flow chart of a communication method 300 for the unlicensed spectrum according to an embodiment of the present disclosure. The method 300 includes at least part of the following.

It should be noted that, the embodiment of the present disclosure takes a sending device as a network device and a receiving device as a terminal device as an example for description, but the present disclosure is not limited to this. The method of the embodiment of the disclosure may also be applied to other scenarios, such as a scenario of D2D transmission or V2V transmission, i.e. both the sending device and the receiving device are terminal devices.

In 310, a network device sends a plurality of reference signals to a terminal device, where the reference signals are used for indicating that the network device has obtained the COT.

In 320, the terminal device detects the reference signal.

In 330, after the terminal device has detected the reference signal, the terminal device detects second information used for indicating data receiving or sending within the COT.

Optionally, the plurality of the reference signals within the COT may be periodically distributed at different positions of the COT, where the different positions may include a starting position of the COT.

Optionally, the reference signal in the embodiment of the disclosure may be any one of the following signals: a Preamble, a PSS, a SSS, a DMRS, a CSI-RS or a newly designed reference signal used for indicating first information.

If the reference signal is a DMRS, the first resource may be a CORESET resource. At this time, detecting the reference signal by the terminal device may include the terminal device obtains a first resource, where the first resource may include a CORESET resource and a search space associated with the CORESET resource, and then the terminal device may detect the detection signal on the first resource.

If the reference signal is a signal other than a DMRS, detecting the reference signal by the terminal device may include the terminal device obtains configuration information of the reference signal, where the configuration information of the reference signal may include a generation mode of the reference signal and a first resource, and then the terminal device may detect the reference signal on the first resource.

Optionally, the terminal device may obtain the first resource based on a protocol agreement; or, the terminal device may obtain the first resource through a broadcast message; or, the terminal device may obtain a RRC dedicated signaling configured with the first resource, and after having received the RRC dedicated signaling, the terminal device may obtain the first resource.

Figure 12:
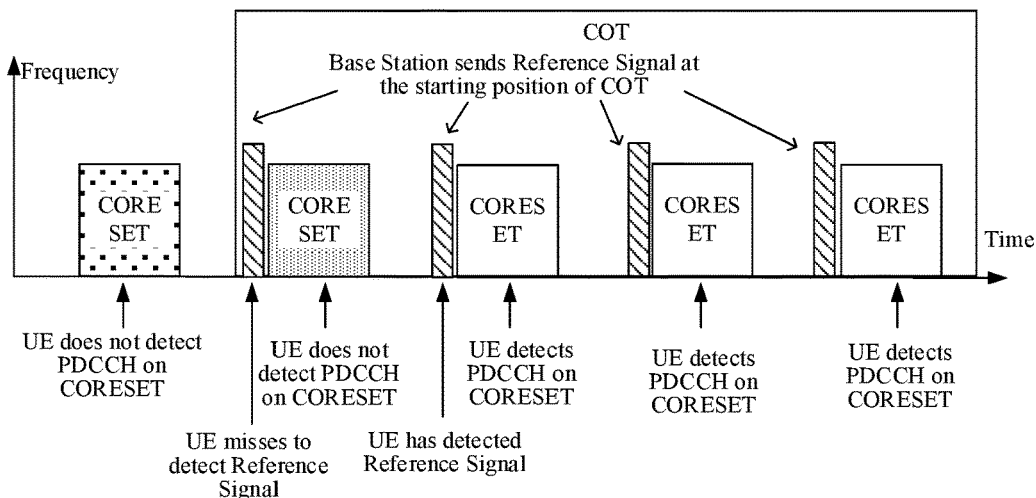
FIG. 12 is a schematic diagram of a plurality of the reference signals being in the COT according to an embodiment of the present disclosure.

Specifically, referring to FIG. 12, the description takes the reference signal as a Preamble as an example. After the network device performs LBT successfully, the network device sends the reference signal several times within the COT, and the terminal device obtains configuration information of the reference signal, where the configuration information of the reference signal may include a generation mode of the reference signal and information of a time-frequency-domain position available for sending the reference signal, i.e. information of the first resource. The terminal device obtains configuration information of a third resource (CORESET), where the configuration information of the third resource may include configuration of the CORESET itself and configuration of a search space associated with the CORESET. After having detected the reference signal on the first resource, the terminal device detects second information on the third resource. At this time, the corresponding situation is that the terminal device has monitored the starting position of the COT by detection of the preamble, and utilizes a preconfigured CORESET resource to detect a DCI message carried on a PDCCH within the COT, so that the terminal device can schedule data transceiving. Correspondingly, for the network device, the network device determines the configuration information of the reference signal, and determines the configuration information of the third resource. When having detected that the channel is idle and available, the network device sends the reference signal several times on the first resource within the COT, and schedules data transceiving of the terminal device on the third resource within the COT.

Optionally, the first resource and the third resource may be different. At this time, a period of the first resource may be less than a period of the third resource.

In one possible embodiment, detecting the reference signal by the terminal device may include the terminal device detecting the reference signal based on a parameter of the reference signal.

Optionally, the parameter of the reference signal may be a sequence of the reference signal or a time-frequency resource position of the reference signal.

In the embodiment, the terminal device may determine a position of the reference signal within the COT based on the parameter of the reference signal, and then detect the second information based on the position of the reference signal within the COT.

Specifically, when the network device sends the reference signal to the terminal device, a parameter of the reference signal sent at the starting position of the COT is different from a parameter of the reference signal sent at other position of the COT.

For example, the network device adopts sequence A for sending in a first time unit within the COT, and adopts sequence B for sending in other time unit within the COT. In this way, when the network device has detected the sequence A, it may determine that the current time unit is the first time unit within the COT; and when the network device has detected the sequence B, it may determine that the current time unit is a non-first time unit within the COT.

In this way, the terminal device may distinguish whether it is currently at the starting position of the COT or the position within the COT through the reference signal, thereby the terminal device may adopt different time sequences to detect the second information on different preconfigured resources.

Optionally, the terminal device may determine whether it is currently within the COT or outside the COT through different sequences, or may determine whether it is within the COT or outside the COT currently based on different sequences and predefined (or preconfigured) length of the COT, which is not specifically limited in the embodiment of the present disclosure. In this way, the terminal device may detect the second information within the COT.

It should be understood that although the method 200 and the method 300 are described above respectively, it does not mean that the method 200 and the method 300 are independent, and the descriptions of each method may refer to each other. For example, if there is no contradiction, the related description in the method 200 may be applicable to the method 300.

In the embodiment of the present disclosure, there may be a plurality of the reference signals within the COT, so that it may avoid the problem that if there is only one reference sign within the COT, the terminal device may fail to detect the reference signal due to detection issues of the terminal device or channel quality issues. That is, the problem that the terminal device misses detecting the reference signal may be avoided.

It should be noted that, on the premise of no conflict, the various embodiments and/or the technical features of the various embodiments described in the present disclosure may be arbitrarily combined with each other, and the technical scheme obtained after combination shall also fall into the protection scope of the present disclosure.

It should be understood that in various embodiments of the present disclosure, the size of the sequence number of the above process does not mean the order of execution, and the execution order of each process should be determined by its function and internal logic, and should not constitute any restriction on the implementation process of the embodiment of the present disclosure.

The data transmission method according to the embodiment of the present disclosure has been described in detail above. The communication apparatus according to the embodiment of the present disclosure will be described below in combination with FIGS. 13 to 17, and the technical feature described in the method embodiment is applicable to the following apparatus embodiment.

Figure 13:
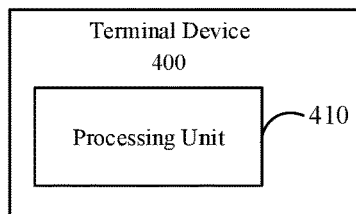
FIG. 13 is a schematic block diagram of the terminal device provided by an embodiment of the present disclosure.

FIG. 13 illustrates a schematic block diagram of a terminal device 400 of an embodiment of the present disclosure. As shown in FIG. 13, the terminal device 400 includes a processing unit 410, configured to detect first information used for indicating COT information.

The processing unit 410 is further configured to, based on the COT information, detect second information used for indicating data receiving or sending within the COT.

Optionally, in the embodiment of the present disclosure, the COT information includes at least one of: length of the COT, uplink and downlink configuration information within the COT, Synchronization Signal Block (SSB) information within the COT, Channel-State Information Reference Signal (CSI-RS) configuration information within the COT and a rate matching resource within the COT.

Optionally, in the embodiment of the present disclosure, there is a plurality pieces of the first information within the COT.

Optionally, in the embodiment of the present disclosure, the processing unit 410 is further configured to detect a reference signal, where the reference signal is used for indicating that the network device has obtained the COT.

Optionally, in the embodiment of the present disclosure, the processing unit 410 is specifically configured to detect the first information, after the reference signal has been detected.

Optionally, in the embodiment of the present disclosure, there are a plurality of the reference signals within the COT.

Optionally, in the embodiment of the present disclosure, a first resource for detecting the reference signal and a second resource for detecting the first information by the processing unit 410 are the same resource.

Optionally, in the embodiment of the present disclosure, the first resource and the second resource are a control resource set (CORESET) resource.

Optionally, in the embodiment of the present disclosure, the processing unit 410 is specifically configured to obtain the first resource, wherein the first resource includes the CORESET resource and a search space associated with the CORESET resource; and detect the reference signal on the first resource.

Optionally, in the embodiment of the present disclosure, a third resource is different from the first resource and the second resource, and the third resource is a resource used by the processing unit 410 for detecting the second information.

Optionally, in the embodiment of the present disclosure, a first resource for detecting the reference signal and a second resource for detecting the first information by the processing unit 410 are different.

Optionally, in the embodiment of the present disclosure, a period of the first resource is less than a period of the second resource.

Optionally, in the embodiment of the present disclosure, the processing unit 410 is specifically configured to obtain configuration information of the reference signal, where the configuration information of the reference signal includes a generation mode of the reference signal and the first resource; and detect the reference signal on the first resource.

Optionally, in the embodiment of the present disclosure, the processing unit 410 is specifically configured to detect the first information, based on a parameter of the reference signal.

Optionally, in the embodiment of the present disclosure, the parameter of the reference signal includes a sequence of the reference signal or a time-frequency resource position of the reference signal.

Optionally, in the embodiment of the present disclosure, the processing unit 410 obtains a first resource or a second resource by means of a protocol agreement, a broadcast message or a Radio Resource Control (RRC) dedicated signaling, where the first resource is a resource used by the processing unit 410 for detecting the reference signal, and the second resource is a resource used by the processing unit 410 for detecting the first information.

Optionally, in the embodiment of the present disclosure, the reference signal is any one of a Preamble, a PSS, a SSS, a DMRS, a CSI-RS and a reference signal used for indicating the first information.

Optionally, in the embodiment of the present disclosure, a resource used by the processing unit 410 for detecting the second information before the first information has been detected, is different from a resource for detecting the second information after the first information has been detected.

Optionally, in the embodiment of the present disclosure, after the processing unit 410 detects the first information, a resource used for detecting the second information does not include an uplink resource.

Optionally, in the embodiment of the present disclosure, the processing unit 410 is specifically configured to obtain a second resource, where the second resource includes a CORESET resource and a search space associated with the CORESET resource; and detect the first information on the second resource.

It should be understood that the terminal device 400 may correspond to the terminal device in the method 200, and may implement the corresponding operation of the terminal device in the method 200, which will not be described here again for brevity.

Figure 14:
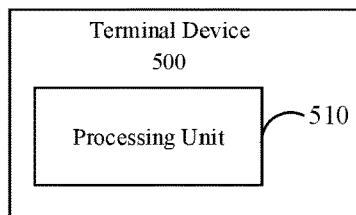
FIG. 14 is a schematic block diagram of the terminal device provided by an embodiment of the present disclosure.

FIG. 14 illustrates a schematic block diagram of a terminal device 500 of an embodiment of the present disclosure. As shown in FIG. 14, the terminal device 500 includes a processing unit 510, configured to detect a reference signal, where the reference signal is used for indicating that a network device has obtained the COT.

The processing unit 510 is further configured to, after the reference signal has been detected, detect second information used for indicating data receiving or sending within the COT; and there are a plurality pieces of the reference signals within the COT.

Optionally, in the embodiment of the present disclosure, the reference signals are periodically distributed at different positions of the COT, and where the different positions include a starting position of the COT.

Optionally, in the embodiment of the present disclosure, the processing unit 510 is specifically configured to detect the second information based on a parameter of the reference signal.

Optionally, in the embodiment of the present disclosure, the parameter of the reference signal includes a sequence of the reference signal or a time-frequency resource position of the reference signal.

Optionally, in the embodiment of the present disclosure, a first resource used by the processing unit 510 for detecting the reference signal is a control resource set (CORESET) resource.

Optionally, in the embodiment of the present disclosure, the processing unit 510 is specifically configured to obtain the first resource, where the first resource includes the CORESET resource and a search space associated with the CORESET resource; and detect the reference signal, on the first resource.

Optionally, in the embodiment of the present disclosure, the processing unit 510 is specifically configured to obtain configuration information of the reference signal, where the configuration information of the reference signal includes a generation mode of the reference signal and a first resource; and detect the reference signal on the first resource.

Optionally, in the embodiment of the present disclosure, the processing unit 510 obtains the first resource by means of a protocol agreement, a broadcast message or a RRC dedicated signaling.

Optionally, in the embodiment of the present disclosure, a third resource used by the processing unit 510 for detecting the second information is different from the first resource.

Optionally, in the embodiment of the present disclosure, a period of the first resource is less than a period of the third resource.

Optionally, in the embodiment of the present disclosure, the reference signal is any one of a Preamble, a PSS, a SSS, a DMRS and a CSI-RS.

It should be understood that the terminal device 500 may correspond to the terminal device in the method 300, and may implement the corresponding operation of the terminal device in the method 300, which will not be described here again for brevity.

Figure 15:
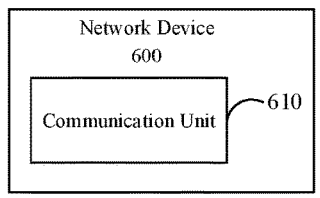
FIG. 15 is a schematic block diagram of the network device provided by an embodiment of the present disclosure.

FIG. 15 illustrates a schematic block diagram of a network device 600 of an embodiment of the present disclosure. As shown in FIG. 15, the network device 600 includes a communication unit 610, configured to send first information used for indicating COT information to a terminal device, and send second information used for indicating data receiving or sending to the terminal device.

Optionally, in the embodiment of the present disclosure, the COT information includes at least one of: length of the COT, uplink and downlink configuration information within the COT, Synchronization Signal Block (SSB) information within the COT, Channel-State Information Reference Signal (CSI-RS) configuration information within the COT and a rate matching resource within the COT.

Optionally, in the embodiment of the present disclosure, a plurality pieces of the first information are within the COT.

Optionally, in the embodiment of the present disclosure, the communication unit 610 is further configured to send a reference signal to the terminal device, where the reference signal is used for indicating that the network device has obtained the COT.

Optionally, in the embodiment of the present disclosure, the communication unit 610 is specifically configured to send a plurality of the reference signals to the terminal device, within the COT.

Optionally, in the embodiment of the present disclosure, the communication unit 610 is specifically configured to send a plurality of the reference signals to the terminal device periodically, within the COT.

Optionally, in the embodiment of the present disclosure, a first resource for sending the reference signal and a second resource for sending the first information by the communication unit 610 are the same resource.

Optionally, in the embodiment of the present disclosure, the first resource and the second resource are a control resource set (CORESET) resource.

Optionally, in the embodiment of the present disclosure, the network device 600 further includes a processing unit 620, configured to obtain the first resource, where the first resource includes the CORESET resource and a search space associated with the CORESET resource; and the communication unit 610, specially configured to send the reference signal on the first resource.

Optionally, in the embodiment of the present disclosure, a third resource is different from the first resource and the second resource, and where the third resource is a resource used by the communication unit 610 for sending the second information.

Optionally, in the embodiment of the present disclosure, a first resource for sending the reference signal and a second resource for sending the first information by the communication unit 610 are different.

Optionally, in the embodiment of the present disclosure, a period of the first resource is less than a period of the second resource.

Optionally, in the embodiment of the present disclosure, the network device 600 further includes a processing unit 620, configured to obtain configuration information of the reference signal, where the configuration information of the reference signal includes a generation mode of the reference signal and the first resource; and the communication unit 610 is specially configured to send the reference signal on the first resource.

Optionally, in the embodiment of the present disclosure, a parameter of the reference signal sent by the communication unit 610 at a starting position of the COT is different from a parameter of the reference signal sent at other position of the COT.

Optionally, in the embodiment of the present disclosure, the parameter of the reference signal includes a sequence of the reference signal or a time-frequency resource position of the reference signal.

Optionally, in the embodiment of the present disclosure, the reference signal is any one of a Preamble, a PSS, a SSS, a DMRS, a CSI-RS and a reference signal used for indicating the first information.

Optionally, in the embodiment of the present disclosure, the network device 600 further includes a processing unit 620, configured to obtain a second resource, where the second resource includes a CORESET resource and a search space associated with the CORESET resource; and the communication unit 610 is specially configured to send the first information on the second resource.

It should be understood that the network device 600 may correspond to the network device in the method 200, and may implement the corresponding operation of the network device in the method 200, which will not be described here again for brevity.

Figure 16:
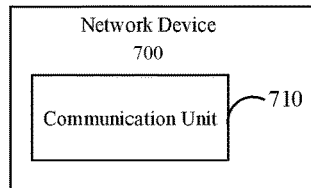
FIG. 16 is a schematic block diagram of the network device provided by an embodiment of the present disclosure.

FIG. 16 illustrates a schematic block diagram of a network device 700 of an embodiment of the present disclosure. As shown in FIG. 16, the network device 700 includes a communication unit 710, configured to send a plurality of reference signals to a terminal device within COT, where the reference signals are used for indicating that the network device has obtained the COT; and send second information used for indicating data receiving or sending to the terminal device.

Optionally, in the embodiment of the present disclosure, the reference signals are periodically distributed at different positions of the COT, and where the different positions include a starting position of the COT.

Optionally, in the embodiment of the present disclosure, a parameter of the reference signal sent by the communication unit 710 at a starting position of the COT is different from a parameter of the reference signal sent at other position of the COT.

Optionally, in the embodiment of the present disclosure, the parameter of the reference signal includes a sequence of the reference signal or a time-frequency resource position of the reference signal.

Optionally, in the embodiment of the present disclosure, a first resource used by the communication unit 710 for sending the reference signal is a control resource set (CORESET) resource.

Optionally, in the embodiment of the present disclosure, the network device 700 further includes a processing unit 720, configured to obtain the first resource, where the first resource includes the CORESET resource and a search space associated with the CORESET resource; and the communication unit 710 is specially configured to send a plurality of the reference signals on the first resource.

Optionally, in the embodiment of the present disclosure, the network device 700 further includes a processing unit 720, configured to obtain configuration information of the reference signal, where the configuration information of the reference signal includes a generation mode of the reference signal and a first resource; and the communication unit 710 is specially configured to send a plurality of the reference signals on the first resource.

Optionally, in the embodiment of the present disclosure, a third resource used by the communication unit 710 for sending the second information is different from the first resource.

Optionally, in the embodiment of the present disclosure, a period of the first resource is less than a period of the third resource.

Optionally, in the embodiment of the present disclosure, the reference signal is any one of a Preamble, a PSS, a SSS, a DMRS, and a CSI-RS.

It should be understood that the network device 1300 may correspond to the network device in the method 300, and may implement the corresponding operation of the network device in the method 300, which will not be described here again for brevity.

Figure 17:
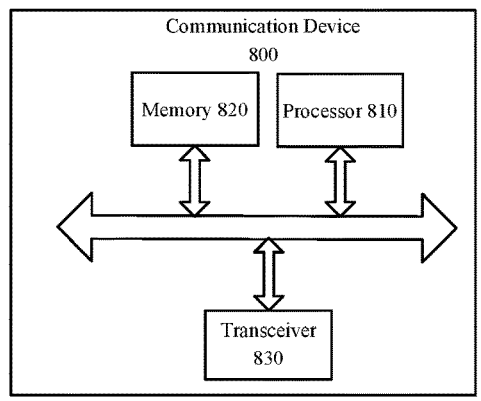
FIG. 17 is a schematic block diagram of a communication device provided by an embodiment of the present disclosure.

FIG. 17 is a schematic block diagram of a communication device 800 provided by an embodiment of the present disclosure. The communication device 800 as shown in FIG. 17 includes a processor 810, which may call and run a computer program from a memory to implement the method in the embodiment of the present disclosure.

Optionally, as shown in FIG. 17, the communication device 800 may further include a memory 820. The processor 810 may call and run a computer program from the memory 820, to implement the method in the embodiment of the present disclosure.

The memory 820 may be a separate component independent of the processor 810, or may be integrated in the processor 810.

Optionally, as shown in FIG. 17, the communication device 800 may further include a transceiver 830, and the processor 810 may control the transceiver 830 to communicate with other device, specifically, may send information or data to other device, or receive information or data sent by other device.

The transceiver 830 may include a transmitter and a receiver. The transceiver 830 may further include an antenna, and the number of antenna may be one or more.

Optionally, the communication device 800 may specifically be a terminal device of an embodiment of the present disclosure, and the communication device 800 may implement the corresponding process implemented by the terminal device in each method of the embodiment of the present disclosure, which will not be described again for brevity.

Optionally, the communication device 800 may specifically be a network device of an embodiment of the present disclosure, and the communication device 1000 may implement the corresponding process implemented by the network device in each method of the embodiment of the present disclosure, which will not be described again for brevity.

Figure 18:
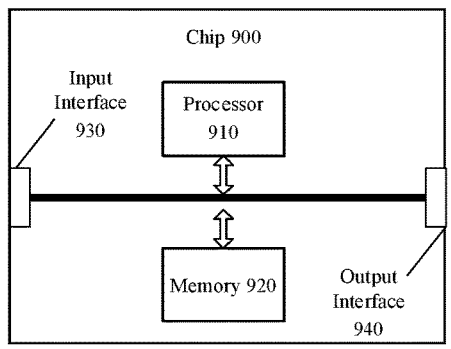
FIG. 18 is a schematic block diagram of a chip provided by an embodiment of the present disclosure.

FIG. 18 is a schematic block diagram of a chip of an embodiment of the present disclosure. The chip 900 as shown in FIG. 18 includes a processor 910, which may call and run a computer program from a memory to implement the method in the embodiment of the present disclosure.

Optionally, as shown in FIG. 18, the chip 900 may further include a memory 920. The processor 910 may call and run a computer program from the memory 920 to implement the method in the embodiment of the present disclosure.

The memory 920 may be a separate component independent of the processor 910, or may be integrated in the processor 910.

Optionally, the chip 900 may further include an input interface 930. The processor 910 may control the input interface 930 to communicate with other device or chip, specifically, may obtain information or data sent by other device or chip.

Optionally, the chip 900 may further include an output interface 940. The processor 910 may control the output interface 940 to communicate with other device or chip, specifically, may output information or data to other device or chip.

Optionally, the chip may be applied to the terminal device in the embodiment of the present disclosure, and the chip may implement the corresponding process implemented by the terminal device in each method of the embodiment of the present disclosure, which will not be described again for brevity.

Optionally, the chip may be applied to the network device in the embodiment of the present disclosure, and the chip may implement the corresponding process implemented by the network device in each method of the embodiment of the present disclosure, which will not be described again for brevity.

It should be understood that the chip mentioned in the embodiment of the present disclosure may also be referred to as a system-level chip, a system chip, a chip system, or a system-on-chip, etc.

It should be understood that the processor of the embodiments of the present disclosure may be an integrated circuit chip with signal processing capability. In the implementation process, each step of the above method embodiments may be completed by hard ware integrated logic circuits in the processor or instructions in the form of software. The above processor may be a general-purpose processor, a digital signal processor (DSP), an application specific integrated circuit (ASIC), a field programmable gate array (FPGA) or other programmable logic parts, discrete gates or transistor logic parts, discrete hardware components. Each method, step and logic block diagram disclosed in the embodiments of the present disclosure may be implemented or executed. The general-purpose processor may be a microprocessor, or the processor may also be any conventional processor or the like. The steps of the method disclosed in combination with the embodiments of the present disclosure may be directly reflected as the execution by a hardware decoding processor, or by a combination of hardware and software modules in the decoding processor. The software module may be located in a mature storage medium of the art, such as a random access memory, a flash memory, a read-only memory, a programmable read-only memory or an electrically erasable programmable memory, a register, etc. The storage medium is located in the memory, and the processor reads information in the memory and completes the steps of the above method in combination with its hardware.

It can be understood that the memory in the embodiments of the present disclosure may be a volatile memory or a non-volatile memory, or may include both volatile and non-volatile memories. The non-volatile memory may be a Read-Only Memory (ROM), a Programmable ROM (PROM), an Erasable PROM (EPROM), an Electrically EPROM (EEPROM) or a flash memory. The non-volatile memory may be a Random Access Memory (RAM) which serves as an external cache. By way of exemplary but not restrictive description, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synch link DRAM (SLDRAM) and a Direct Rambus RAM (DR RAM). It should be noted that the memories of the system and method described herein are intended to include, but are not limited to these and any other suitable types of memories.

It should be understood that the above memory is exemplary but not limited restrictive, for example, the memory of the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a Direct Rambus RAM (DR RAM), etc. That is to say, the memories of the embodiments of the present disclosure are intended to include, but are not limited to these and any other suitable types of memories.

Figure 19:
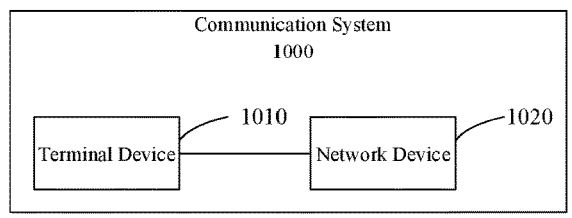
FIG. 19 is a schematic block diagram of a communication system provided by an embodiment of the present disclosure.

FIG. 19 is a schematic block diagram of a communication system 1000 provided by an embodiment of the present disclosure. As shown in FIG. 10, the communication system 100 includes a terminal device 1010 and a network device 1020.

The terminal device 1010 may be applied to implement the corresponding functions implemented by the terminal device in the above method, and the network device 1020 may be applied to implement the corresponding functions implemented by the network device in the above method, which will not be described here again for brevity.

The embodiment of the present disclosure also provides a computer-readable storage medium configured to store a computer program.

Optionally, the computer-readable storage medium may be applied to the terminal device in the embodiment of the present disclosure, and the computer program enables the computer to perform the corresponding process implemented by the first terminal device or the second terminal device in each method of the embodiment of the present disclosure, which will not be described here again for brevity.

Optionally, the computer-readable storage medium may be applied to the network device in the embodiments of the present disclosure, and the computer program enables the computer to perform the corresponding process implemented by the network device in each method of the embodiment of the present disclosure, which will not be described here again for brevity.

The embodiment of the present disclosure also provides a computer program product including computer program instructions.

Optionally, the computer program product may be applied to the terminal device in the embodiments of the present disclosure, and the computer program instruction enables the computer to perform the corresponding process implemented by the first terminal device or the second terminal device in each method of the embodiment of the present disclosure, which will not be described here again for brevity.

Optionally, the computer program product may be applied to the network device in the embodiments of the present disclosure, and the computer program instruction enables the computer to perform the corresponding process implemented by the network device in each method of the embodiment of the present disclosure, which will not be described here again for brevity.

The embodiment of the present disclosure also provides a computer program.

Optionally, the computer program may be applied to the terminal device in the embodiments of the present disclosure, and when the computer program runs on the computer, the computer is caused to perform the corresponding process implemented by the first terminal device or the second terminal device in each method of the embodiment of the present disclosure, which will not be described here again for brevity.

Optionally, the computer program may be applied to the network device in the embodiments of the present disclosure, and when the computer program runs on the computer, the computer is caused to perform the corresponding process implemented by the network device in each method of the embodiment of the present disclosure, which will not be described here again for brevity.

Those of ordinary skill in the art can be aware that the unit and algorithm step of each example described in conjunction with the embodiments disclosed herein may be implemented by electronic hardware, or a combination of computer software and electronic hardware. Whether these functions are executed in the form of hardware or software depends on the specific application and design constraints of the technical solution. Professionals and technicians may use different methods for each specific application to implement the described function, but such implementation should not be considered beyond the scope of the present disclosure.

Those skilled in the art can clearly understand that, for the convenience and conciseness of the description, the specific working process of the system, apparatus and unit described above may refer to the corresponding process in the aforementioned method embodiments, which will not be described here again.

In the several embodiments provided by the present disclosure, it should be understood that the disclosed system, apparatus and method may be implemented in other manners. For example, the apparatus embodiment described above is merely exemplary. For example, the division of the units is merely one kind of logical function division, and there may be other division manners in actual implementation. For example, multiple units or components may be combined or integrated in another system, or some features may be ignored or not executed. On the other hand, the mutual coupling or direct coupling or communication connection shown or discussed may be indirect coupling or communication connection through some interfaces, apparatus or units, and may be in electrical, mechanical or other forms.

The unit described as a separate component may or may not be physically separated, and the component displayed as a unit may or may not be a physical unit, that is, it may be located in one place, or may be distributed on multiple network units. Some or all of the units may be selected according to actual needs to achieve the objectives of the solutions of the embodiments.

In addition, each functional unit in each embodiment of the present disclosure may be integrated in one processing unit, or each unit may exist alone physically, or two or more above units may be integrated in one unit.

The functions may also be stored in a computer-readable storage medium if being implemented in the form of a software functional unit and sold or used as an independent product. Based on such understanding, the essence of the technical solution of the present disclosure or the part contributing to the prior art or part of the technical solution may be embodied in the form of a software product, and the computer software product is stored in a storage medium including several instructions such that a computer device (which may be a personal computer, a server, or a network device, etc.) executes all or part of the steps of the method described in each embodiment of the present disclosure. The aforementioned storage medium includes a U disk, a mobile hard disk, a read-only memory (ROM), a random access memory (RAM), a magnetic disk or an optical disk and other mediums that can store program codes.

The foregoing descriptions are merely specific implementations of the embodiments of the present disclosure, and the protection scope of the embodiments of the present disclosure is not limited thereto. Any person skilled in the art can easily think of changes or substitutions within the technical scope disclosed in the present disclosure, and all the changes or substitutions should be covered in the protection scope of the present disclosure. Therefore, the protection scope of the present disclosure should be subject to the protection scope of the claims.

What is claimed is:

1. A communication method for unlicensed spectrum, comprising:
   detecting, by a terminal device, a reference signal, wherein the reference signal is used for indicating that a network device has obtained Channel Occupancy Time (COT); and
   detecting, by the terminal device, second information used for indicating data receiving or sending within the COT, after the reference signal has been detected, wherein there are a plurality of the reference signals within the COT,
   wherein a first resource used by the terminal device for detecting the reference signal is a control resource set (CORESET) resource.

2. The communication method according to claim 1, wherein the reference signal is periodically distributed at different positions of the COT, and wherein the different positions comprise a starting position of the COT.

3. The communication method according to claim 1, wherein detecting, by the terminal device, the second information used for indicating data receiving or sending within the COT, after the reference signal has been detected comprises:
   detecting, by the terminal device, the second information, based on a parameter of the reference signal.

4. The communication method according to claim 3, wherein the parameter of the reference signal comprises a sequence of the reference signal or a time-frequency resource position of the reference signal.

5. The communication method according to claim 1, wherein the detecting, by the terminal device, the reference signal comprises:
   obtaining, by the terminal device, the first resource, wherein the first resource comprises the CORESET resource and a search space associated with the CORESET resource; and
   detecting, by the terminal device, the reference signal, on the first resource.

6. The communication method according to claim 1, wherein the detecting, by the terminal device, the reference signal comprises:
   obtaining, by the terminal device, configuration information of the reference signal, wherein the configuration information of the reference signal comprises a generation mode of the reference signal and the first resource; and
   detecting, by the terminal device, the reference signal, on the first resource.

7. The communication method according to claim 1, wherein the terminal device obtains the first resource by means of a protocol agreement, a broadcast message or a Radio Resource Control (RRC) dedicated signaling.

8. The communication method according to claim 1, wherein a third resource used by the terminal device for detecting the second information is different from the first resource.

9. The communication method according to claim 8, wherein a period of the first resource is less than a period of the third resource.

10. The communication method according to claim 1, wherein the reference signal is any one of a Random Access Preamble (Preamble), a Primary Synchronization Signal (PSS), a Secondary Synchronization Signal (SSS), a Demodulation Reference Signal (DMRS) and a Channel-State Information Reference Signal (CSI-RS).

11. A terminal device, comprising:
    a memory; and
    a processor,
    wherein the memory is configured to store a computer program, and the processor is configured to call and run the computer program stored in the memory to:
    detect a reference signal, wherein the reference signal is used for indicating that a network device has obtained Channel Occupancy Time (COT),
    wherein the processor is further configured to, after the reference signal has been detected, detect second information used for indicating data receiving or sending within the COT, and wherein there are a plurality of pieces of the reference signals within the COT,
wherein a first resource used for detecting the reference signal is a control resource set (CORESET) resource.

12. The terminal device according to claim 11, wherein the reference signals are periodically distributed at different positions of the COT, and wherein the different positions comprise a starting position of the COT.

13. The terminal device according to claim 11, wherein the processor is further configured to:
detect the second information, based on a parameter of the reference signal.

14. The terminal device according to claim 13, wherein the parameter of the reference signal comprises a sequence of the reference signal or a time-frequency resource position of the reference signal.

15. The terminal device according to claim 11, wherein the reference signal is any one of a Random Access Preamble (Preamble), a Primary Synchronization Signal (PSS), a Secondary Synchronization Signal (SSS), a Demodulation Reference Signal (DMRS) and a Channel-State Information Reference Signal (CSI-RS).

16. A network device, comprising:
a memory; and
a processor,
wherein the memory is configured to store a computer program, and the processor is configured to call and run the computer program stored in the memory to:
send a plurality of reference signals to a terminal device within Channel Occupancy Time (COT),
wherein the reference signals are used for indicating that the network device has obtained the COT; and
send second information used for indicating data receiving from or sending to the terminal device,
wherein a first resource used for detecting the reference signal is a control resource set (CORESET) resource.

17. The network device according to claim 16, wherein the reference signals are periodically distributed at different positions of the COT, and wherein the different positions comprise a starting position of the COT.

18. The network device according to claim 16, wherein the reference signal is any one of a Random Access Preamble (Preamble), a Primary Synchronization Signal (PSS), a Secondary Synchronization Signal (SSS), a Demodulation Reference Signal (DMRS) and a Channel-State Information Reference Signal (CSI-RS).

* * * * *